(12) United States Patent
Meyers

(10) Patent No.: US 9,442,307 B2
(45) Date of Patent: *Sep. 13, 2016

(54) MULTICOMPONENT OPTICAL DEVICE HAVING A SPACE

(71) Applicant: CRT Technology, Inc., Mesa, AZ (US)

(72) Inventor: William E. Meyers, Scottsdale, AZ (US)

(73) Assignee: CRT Technology, Inc., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/502,346

(22) Filed: Sep. 30, 2014

(65) Prior Publication Data

US 2015/0036099 A1    Feb. 5, 2015

Related U.S. Application Data

(63) Continuation of application No. 13/980,023, filed as application No. PCT/US2013/032314 on Mar. 15, 2013, now Pat. No. 8,911,078.

(60) Provisional application No. 61/651,722, filed on May 25, 2012.

(51) Int. Cl.
*G02C 7/02* (2006.01)
*G02C 7/04* (2006.01)
*B29D 11/00* (2006.01)

(52) U.S. Cl.
CPC ......... *G02C 7/049* (2013.01); *B29D 11/00048* (2013.01); *B29D 11/00076* (2013.01); *B29D 11/00807* (2013.01)

(58) Field of Classification Search
CPC ........................... G02C 7/049; B29D 11/0076
USPC ................. 351/159.04, 159.24, 159.73, 178, 351/159.34

See application file for complete search history.

(56) References Cited

U.S. PATENT DOCUMENTS 1,929,228 A    10/1933  Nilhelm
2,641,161 A     6/1953  Silverstein (Continued)

FOREIGN PATENT DOCUMENTS

CA    2280022    1/2001
DE     861753    7/1949

(Continued)

OTHER PUBLICATIONS

Extended European Search Report for European Application No. 13794262.9 dated Apr. 17, 2015.

(Continued)

*Primary Examiner* — Darryl J Collins
(74) *Attorney, Agent, or Firm* — Law Offices of Damon L. Boyd, PLLC

(57) ABSTRACT

The present disclosure relates generally to multicomponent optical devices having a space within the device. In various embodiments, an optical device comprises a first posterior component having an anterior surface, a posterior support component, and an anterior component having a posterior surface. An optical device can also comprise an anterior skirt. The first posterior component and the anterior skirt can comprise gas-permeable optical materials. An optical device also comprises a primary space between the posterior surface and the anterior surface, with the primary space configured to permit diffusion of a gas from a perimeter of the primary space through the space and across the anterior surface of the first posterior component. A method of forming a multicomponent optical device having a space is also provided.

21 Claims, 8 Drawing Sheets

(56) References Cited

U.S. PATENT DOCUMENTS

| | | |
|---|---|---|
| 3,246,941 A | 4/1966 | Moss |
| 3,488,111 A | 1/1970 | Isen |
| 3,710,795 A | 1/1973 | Higuchi et al. |
| 3,973,838 A | 8/1976 | Page |
| 4,099,859 A | 7/1978 | Merrill |
| 4,174,156 A | 11/1979 | Glorieux |
| 4,401,371 A | 8/1983 | Neefe |
| 4,477,158 A | 10/1984 | Pollock et al. |
| 4,621,912 A | 11/1986 | Meyer |
| 4,681,412 A | 7/1987 | Lemelson |
| 4,720,286 A | 1/1988 | Bailey et al. |
| 4,731,078 A | 3/1988 | Stoy et al. |
| 5,010,141 A | 4/1991 | Mueller |
| 5,104,213 A | 4/1992 | Wolfson |
| 5,120,121 A | 6/1992 | Rawlings |
| 5,166,710 A | 11/1992 | Hofer et al. |
| 5,270,051 A | 12/1993 | Harris |
| 5,671,038 A | 9/1997 | Porat |
| 5,712,721 A | 1/1998 | Large |
| 5,760,100 A | 6/1998 | Nicolson et al. |
| 6,048,063 A | 4/2000 | Fritsch et al. |
| 6,726,322 B2 | 4/2004 | Andino et al. |
| 6,779,888 B2 | 8/2004 | Marmo |
| 6,851,805 B2 | 2/2005 | Blum et al. |
| 7,559,650 B2 | 7/2009 | Iuliano |
| 7,637,947 B2 | 12/2009 | Smith et al. |
| 7,695,135 B1 | 4/2010 | Rosenthal |
| 8,087,777 B2 | 1/2012 | Rosenthal |
| 8,096,655 B2 | 1/2012 | Daphna |
| 8,142,016 B2 | 3/2012 | Legerton et al. |
| 8,441,731 B2 | 5/2013 | Sprague |
| 8,482,858 B2 | 7/2013 | Sprague |
| 8,520,309 B2 | 8/2013 | Sprague |
| 8,911,078 B2 | 12/2014 | Meyers |
| 2004/0212779 A1 | 10/2004 | Dahi |
| 2006/0290882 A1* | 12/2006 | Meyers ............... G02C 7/047 351/159.62 |
| 2007/0154522 A1 | 7/2007 | Chow et al. |
| 2010/0149618 A1 | 6/2010 | Sprague |
| 2010/0161050 A1 | 6/2010 | Detmers et al. |
| 2010/0265163 A1 | 10/2010 | Legerton et al. |
| 2011/0096100 A1 | 4/2011 | Sprague |
| 2011/0157891 A1 | 6/2011 | Davis et al. |
| 2011/0228213 A1 | 9/2011 | Legerton |
| 2012/0120365 A1 | 5/2012 | Legerton et al. |
| 2012/0147320 A1 | 6/2012 | Legerton et al. |
| 2012/0206691 A1 | 8/2012 | Iwai |
| 2013/0308092 A1 | 11/2013 | Groisman |

FOREIGN PATENT DOCUMENTS

| | | |
|---|---|---|
| EP | 0032517 | 1/1980 |
| EP | 1159941 | 12/2001 |
| EP | 1832913 A1 | 12/2009 |
| FR | 1279252 | 11/1961 |
| FR | 2656933 | 7/1991 |
| WO | 9110154 | 7/1991 |
| WO | 9307840 | 4/1993 |
| WO | 2004015460 | 2/2004 |

OTHER PUBLICATIONS

International Search Report and Written Opinion for corresponding International Application No. PCT/US2013/032314, dated Jun. 17, 2013.

Non-Final Office Action for U.S. Appl. No. 13/980,023, dated Aug. 8, 2014.

Notice of Allowance for U.S. Appl. No. 13/980,023, dated Sep. 16, 2014.

International Preliminary Report on Patentability for corresponding International Application No. PCT/US2013/032314, dated Nov. 25, 2014.

* cited by examiner

216

MULTICOMPONENT OPTICAL DEVICE HAVING A SPACE

CROSS-REFERENCE TO RELATED APPLICATIONS

This application is a continuation application of U.S. patent application Ser. No. 13/980,023, filed Jul. 16, 2013, which is a U.S. National Stage application claiming priority to PCT Application Serial No. PCT/US/2013/032314, filed Mar. 15, 2013, which claimed priority from U.S. Provisional Patent Application Ser. No. 61/651,722, filed on May 25, 2012, all of which are incorporated herein by reference in their entirety.

BACKGROUND

1. Field

The present disclosure relates generally to multicomponent optical devices having a space within the device.

2. Discussion of the Related Art

The development of various miniaturized optical components and the ability to manufacture increasingly sophisticated optical features has driven a growing interest in adapting an expanding array of optical features and other types of technological products to lenses that can be worn on the surface of an eye. Adaptation of various optical features and other technologies to a wearable lens can produce optical devices having thicker lenses than can be accommodated while providing adequate oxygen supply to corneal tissue based on the gas exchange capacity of conventional gas-permeable optical materials and lens designs. Likewise, a variety of optical components may not comprise or be compatible with optical materials having the necessary properties of gas permeability to ensure adequate oxygen transmission to the cornea when placed on an eye.

There is thus a need in the art for optical devices that can modularly incorporate various optical components or features of interest while adequately providing for oxygenation of the corneal cells.

SUMMARY

In general, the present disclosure provides multicomponent optical devices having a space and related methods. For example, in various embodiments, a multicomponent optical device is provided that includes a first posterior component, a posterior support component, and an anterior component. The optical device can also comprise an anterior skirt. The first posterior component and the anterior skirt can comprise a gas-permeable optical material. The first posterior component can comprise an anterior surface and the anterior component can comprise a posterior surface, with the anterior surface and the posterior surface together defining a space within the optical device between the anterior component and the first posterior component.

The configuration of the space, the gas-permeable optical materials, and other features of the multicomponent optical device can facilitate gas exchange through the device that is sufficient, for example, to permit oxygenation of the corneal tissue of an eye by a device comprising a finished lens. In various embodiments, an optical device an also include a peripheral space, and the peripheral space can be in fluid communication with the primary space via portals through device components to provide for gas exchange between the peripheral space and the primary space. The peripheral space can facilitate gas exchange with the atmosphere through the gas permeable material of the anterior skirt. Similarly, the primary space can facilitate gas exchange with, for example, corneal tissue of an eye to which a finished lens in accordance with various embodiments is applied through the gas permeable material of the first posterior component.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE ILLUSTRATED EMBODIMENTS

Figure 1A:
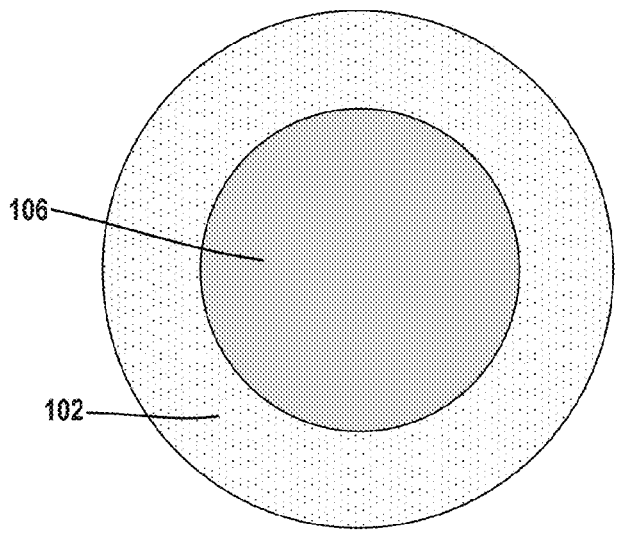
FIGS. 1A-1C illustrate views of a finished lens having a space in accordance with the present disclosure.

Persons skilled in the art will readily appreciate that various aspects of the present disclosure can be realized by any number of methods and systems configured to perform the intended functions. Stated differently, other methods and systems can be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure can be described in connection with various principles and beliefs, the present disclosure should not be bound by theory.

As used herein, "anterior surface" refers to a lens surface closer to an eyelid, and "posterior surface" refers to a lens surface closer to a cornea of the eye.

As used herein, "optical device" can be used to refer to a device having optical features or qualities, including, for example, optical lens blanks, finished optical lenses or other devices or manufacturing process intermediates intended to be used for optical functions such as vision correction, aesthetics, or other optical functions.

As used herein, "optical feature" refers to a sagittal variation from substantially hemispherical (for example defined by a sigmoid, a third order polynomial, a conic constant, or an angle, which may be rotationally symmetric or asymmetric) in relation to very high powers and cylinders, bifocal designs and wavefront aberration nullification, polarization filters, refractive lenslets, diffractive lenslets, selective chromatic filters, bandpass filters, circular polarizing filters, linear polarizer filters, gray attenuator filters, birefringent filters, zone plates, mirrors, electronic circuits, electronic devices, microdisplays, telecommunication devices, sensors, antennas, nanowires, energy generation or storage devices, pharmaceutical delivery devices, etc.

As used herein, "fluid communication" refers the ability of a fluid (i.e., a liquid, gas, or semi-solid) to move or flow from one location to another location. In the context of the present disclosure, the term "fluid communication" may be used to describe a property of spaces or conduits suitable to permit a flow of a gas or liquid between two locations, such as by bulk flow or diffusion.

Figure 1B:
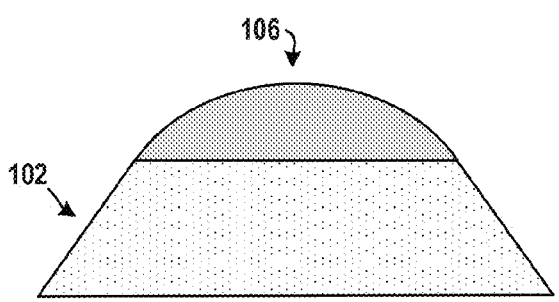
Figure 1C:
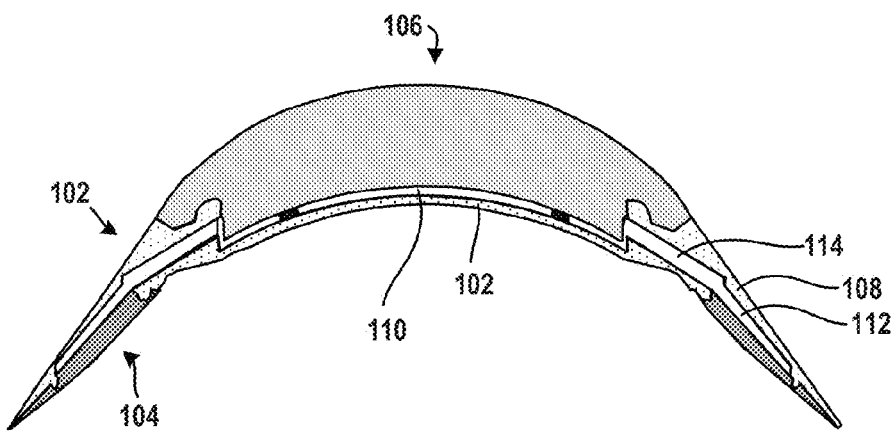

Referring to FIGS. 1A-1C, views of a finished multicomponent lens 100 in accordance with various embodiments of the present disclosure are illustrated. Lens 100 can comprise hard, semi-hard or soft optical materials, as described in more detail below, and can be configured for vision correction, orthokeratology, aesthetics or display technology, to name just a few functions. In various embodiments, a finished lens can be a scleral, corneo-scleral, or corneal lens. Lens 100 can have an outer diameter of from about 5 mm to about 20 mm, with smaller or larger diameters being possible in special cases. By way of non-limiting example, a scleral contact lens can have an outer diameter of up to about 28 mm or more. Furthermore, a finished lens can be radially symmetrical, bilaterally symmetrical, or non-symmetrical, and can include bifocal, toric, or quadrant specific optical features or geometries.

In accordance with various embodiments and as described in greater detail below, lens 100 may be manufactured from a multicomponent optical device, with the finished lens also comprising a multicomponent lens that can include a first posterior component 102, a posterior support component 104, and an anterior component 106. The lens can also include a primary space 110 defined by a posterior surface of the anterior component 106 and an anterior surface of the first posterior component 102. A lens can also comprise an anterior skirt 108, which may or may not comprise a portion of first posterior component 102, along with a peripheral space 112 located between the peripheral skirt and the posterior support component. First posterior component 102 and anterior skirt 108 can comprise gas-permeable optical materials that, in combination with primary space 110, peripheral space 112, and portals 114 connecting the spaces, serve to facilitate gas exchange between an anterior peripheral surface of the lens and a posterior central surface of the lens that would be located adjacent to the corneal tissue if applied to an eye. In this general manner and as described in greater detail below, a lens manufactured from an optical device in accordance with various embodiments can modularly incorporate any of a variety of optical features or devices in anterior component 106 while providing sufficient oxygenation to the corneal tissue of an eye to which the lens is applied.

Figure 2:
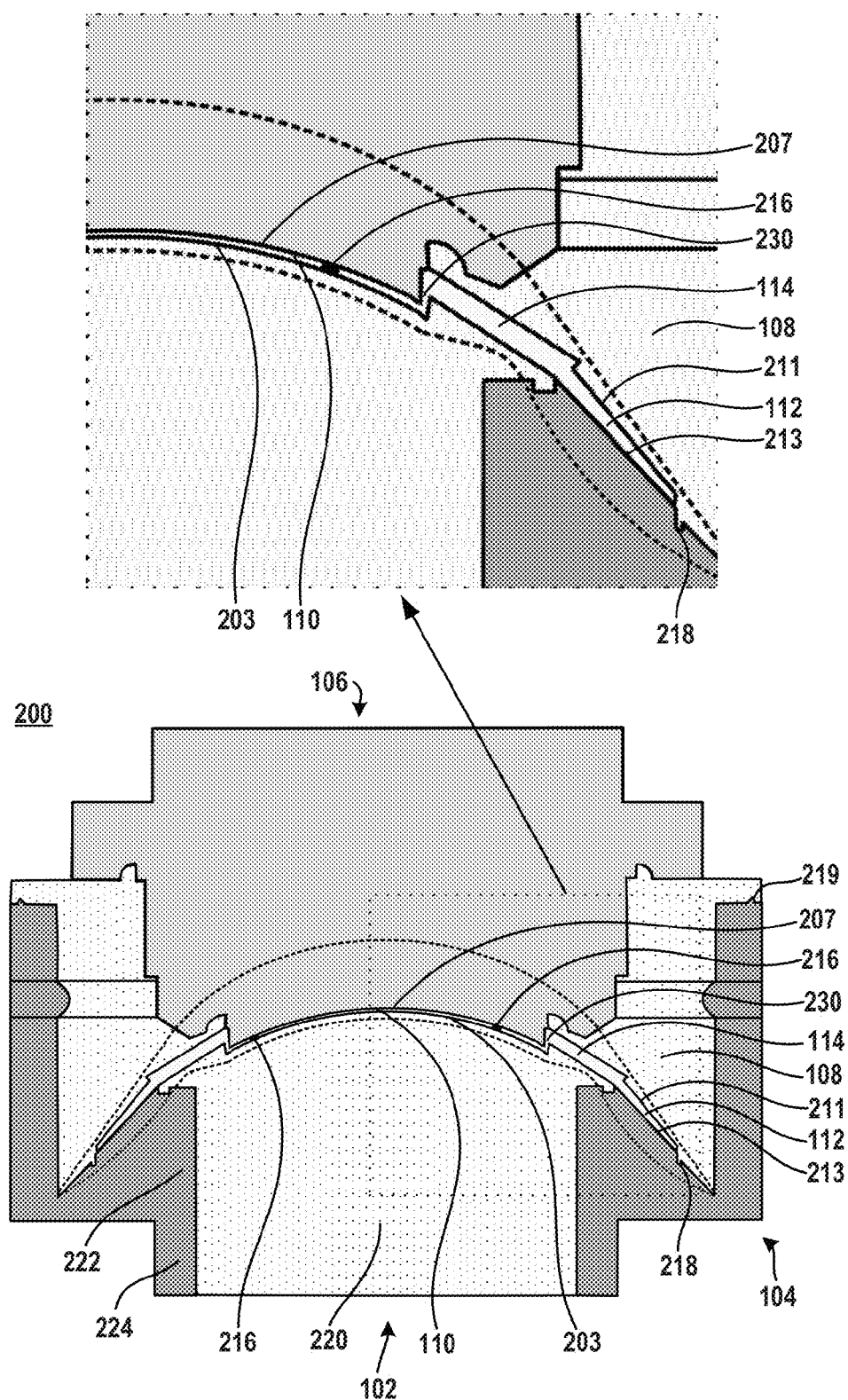
FIG. 2 illustrates a cutaway view of an optical device having a space in accordance with the present disclosure.

With reference now to FIG. 2, an optical device in accordance with various embodiments is illustrated. An optical device can comprise a multicomponent optical device blank, such as multicomponent optical device blank 200 illustrated in FIG. 2, or an optical device can comprise a finished lens such as lens 100, illustrated in FIG. 1 and described above. Broken lines in the cross section of blank 200 shown in FIG. 2 depict the locations of finished lens anterior and posterior surfaces corresponding to the finished surfaces of lens 100, as shown in FIG. 1.

In various embodiments, multicomponent optical device blank 200 can comprise a generally cylindrical blank that includes a first posterior component 102, a posterior support component 104, and an anterior component 106. Blank 200 can further comprise an anterior skirt 108. In accordance with various embodiments, first posterior component 102 and anterior skirt 108 can be comprised of a gas-permeable optical material and can further comprise a single piece of material (i.e., first posterior component 102 and anterior skirt 108 can have a unitary construction, with anterior skirt 108 comprising a portion of first posterior component 102). In other embodiments and as described in greater detail below with reference to FIGS. 6, 7A, and 7B, an anterior skirt such as anterior skirt 608 can comprise a component that is separate from a first posterior component such as first posterior component 602.

Figure 6:
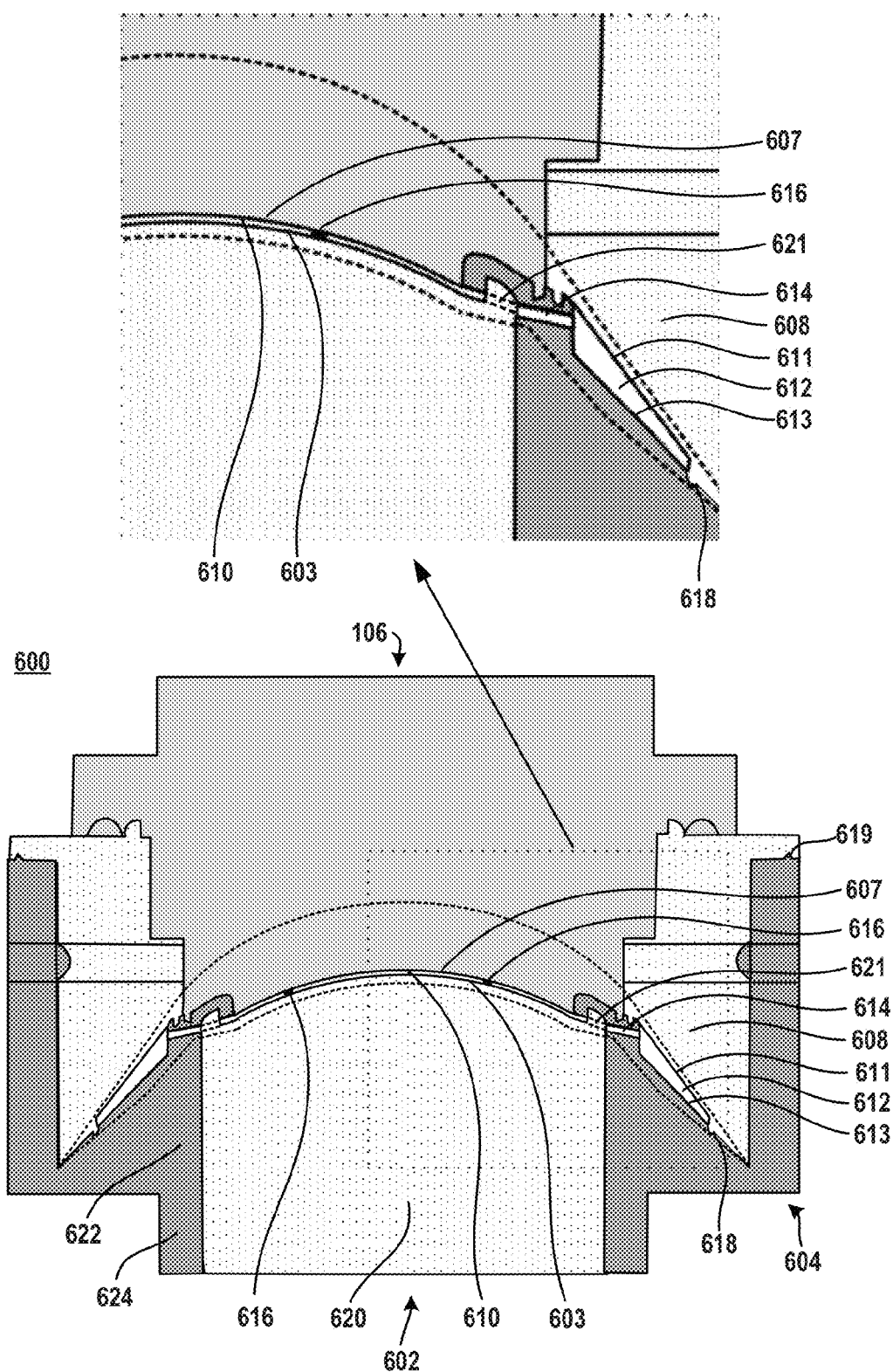
FIG. 6 illustrates a cutaway view of an optical device having a space in accordance with the present disclosure.

First posterior components 102/602 and anterior skirts 108/608 can be comprised of the same material, or, if the first posterior component and the anterior skirt are separate components, as illustrated for blank 600 shown in FIG. 6, can be comprised of different materials. First posterior components 102/602 and/or anterior skirts 108/608 can be comprised of one or more of fluorosilicon acrylate, silicon acrylate, polymethylmethacrylate, a silicon hydrogel, a biocompatible material, a transparent material, or another suitable material. In general, any gas permeable, biocompatible material is suitable for use in first posterior components 102/602 and/or anterior skirts 108/608.

Figure 3A:
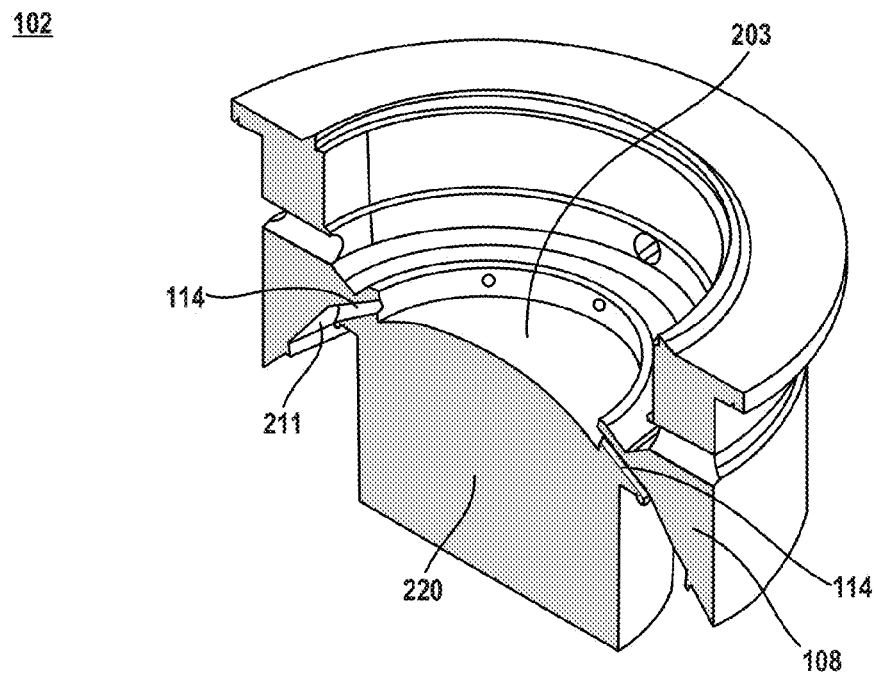
FIGS. 3A and 3B illustrate views of an optical device component in accordance with the present disclosure.
Figure 3B:
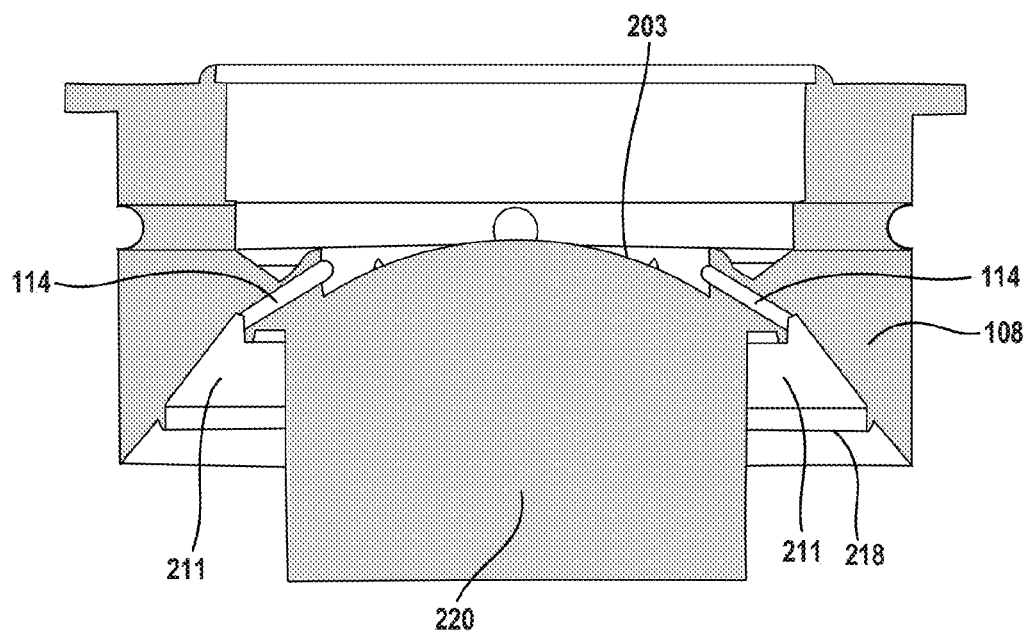

With reference now to FIGS. 2, 3A, and 3B, first posterior component 102 can comprise an anterior component receiving portion and a shaft portion 220. The anterior component receiving portion can comprise a circumferential wall and a bottom wall defining a cavity that is open on an anterior end for receiving an anterior component such as anterior component 206. Shaft portion 220 can comprise a cylindrical axial projection with a configuration that is complementary to and configured to slide within a shaft receiving portion 222 of posterior support component 104, described in greater detail below. The bottom wall of first posterior component 102 can comprise an anterior surface 203. In various embodiments, anterior surface 203 may comprise a convexly curved, optically finished surface, and may further be of a diameter that approximates or is otherwise proportionally related to a diameter of a cornea or other anatomical feature of an eye. As described in greater detail below, anterior surface 203 can define a posterior wall of primary space 110 of an assembled multicomponent optical device blank 200 or lens made therefrom, such as lens 100 (FIG. 1). In various embodiments, the circumferential wall of first posterior component 102 can comprise anterior skirt 108, additional features of which are also described in greater detail below.

First posterior component 102 may also comprise various reference features, reference surfaces and/or functional surfaces. For example, and with continued reference to first posterior component 102 comprising unitary anterior skirt 108, first posterior component 102 can comprise one or more reference features such as ridges 218 and/or grooves 219. Ridges and/or grooves may have any of a variety of profiles and be complementary to corresponding reference features such as grooves and/or ridges located on the surfaces of other optical device components, such as posterior support component 104 or anterior component 106. Reference features may serve to enhance the location, alignment, and integrity of fit between components of an optical device.

Similarly, first posterior component 102 may comprise one or more reference surfaces. A reference surface may be oriented in any direction and may provide a point or plane of reference for alignment of the component with a second component, such as by physical contact between one reference surface and a second reference surface. For example, the peripheral surface of shaft portion 220 may comprise a reference surface suitable for determining alignment of the first posterior component 102 during a mating process with posterior support component 104 in which first posterior component 102 is slideably received by posterior support component 104. First posterior component 102 may also comprise a reference surface such as a transverse surface configured to align with a corresponding (i.e., complementary) transverse reference surface of posterior support component 104 or anterior component 106. Such a transverse reference surface may face anteriorly or posteriorly and may provide a positive stop during assembly of the first posterior component 102 with another device component in an optical device manufacturing method that may rely on an interference fit between pre-formed device components. For example, a method of assembling an optical device can comprise a step of inserting first posterior component 102 into posterior support component 104, which step can proceed until one or more sets of corresponding transverse reference surfaces align with one another.

Figure 7A:
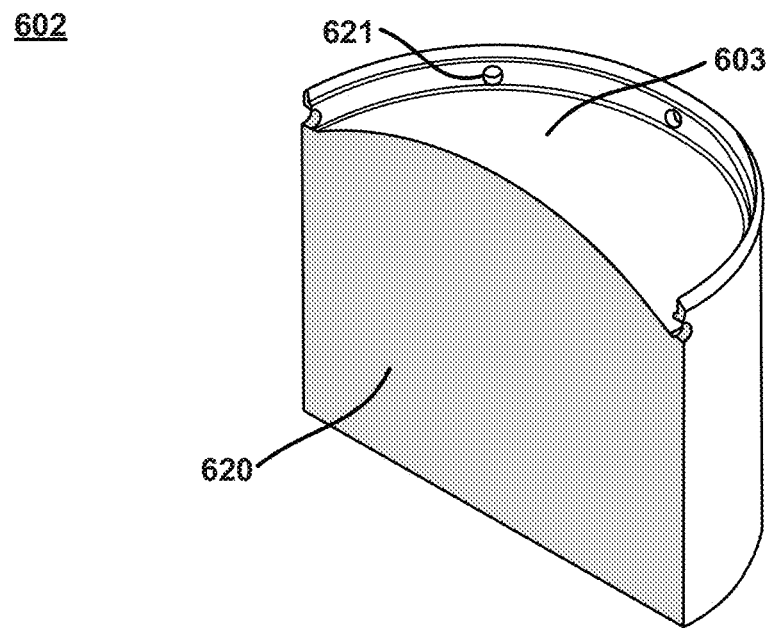
FIGS. 7A and 7B illustrate views of an optical device component in accordance with the present disclosure.
Figure 7B:
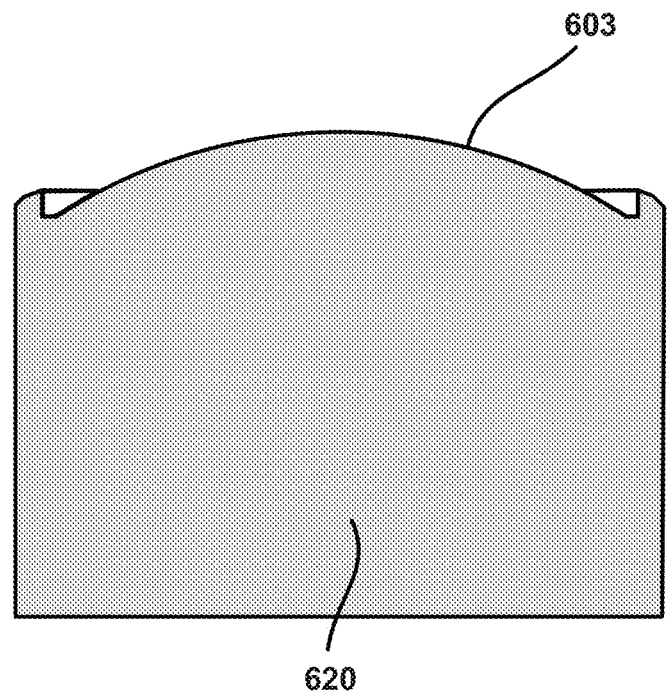

In addition, first posterior component 102 can also comprise functional surfaces. In this regard, as used herein, a "functional surface" can be any surface that contributes to a functional and/or structural feature of an assembled optical device. A functional surface can include anterior surface 203 of first posterior component 102, as mentioned briefly above and described in more detail herein. Referring briefly to FIGS. 6, 7A, and 7B, first posterior component 602 can also comprise a functional surface such as anterior surface 603. First posterior component 102 can also comprise a peripheral posterior surface 211 configured to provide a peripheral space 112 between the surface and a peripheral anterior surface 213 of posterior support component 104 in an assembled optical device. Similarly, and with reference again to FIG. 6, anterior skirt 608 can comprise peripheral posterior surface 611 and be configured to provide a peripheral space 612 between the surface and a peripheral anterior surface 613 of posterior support component 604. Peripheral posterior surface 611 and peripheral space 612 may furthermore have any of the features or characteristics described in more detail below with reference to peripheral posterior surface 211 and peripheral space 112.

Referring again to FIGS. 2, 3A, and 3B, in various embodiments, peripheral posterior surface 211 may comprise a surface described by one or more radial lines having an angular deviation from the axis of optical device blank 200. For example, peripheral posterior surface 211 can be described by an interior surface of a segment of the altitude of a hollow cone, along with a shorter and steeper angular radial segment configured to connect the periphery of the conical segment surface described above with a surface of the posterior support component 104 (i.e., peripheral anterior surface 213) in an assembled optical device. In various embodiments, the peripheral posterior surface 211 may be configured to provide a continuous circumferential peripheral space 112 in an assembled optical device. In other embodiments, peripheral posterior surface 211 may be configured to provide a peripheral space having a different and/or a varying size and/or shape, or may be configured to provide a plurality of peripheral spaces in an assembled optical device.

In accordance with various embodiments, the peripheral space 112 defined by the assembled optical device can facilitate gas exchange between a peripheral surface of optical device blank 200, or an anterior peripheral surface of a finished lens manufactured from the blank (such as lens 100 illustrated in FIG. 1), and the primary space 110, as described below. In various embodiments, gas exchange can occur between peripheral space 112 and a peripheral surface of the optical device or a finished lens via the gas permeable material comprising first posterior component 102 and/or anterior skirt 108. In other embodiments, gas exchange may occur via fenestrations or other openings between peripheral space 112 and a peripheral surface of the optical device or a finished lens. Gas exchanged between the outside of the device or lens and peripheral space 112 can further be exchanged with primary space 110 as described in greater detail below.

First posterior component 102 can comprise one or more openings such as portal 114 communicating between peripheral space 112 and primary space 110. In accordance with various embodiments, a portal 114 can be any type of hole or passageway through the material of the first posterior component 102, with the portal 114 configured to provide fluid communication between the primary space 110 and the peripheral space 112 defined by the assembled optical device. In various embodiments, first posterior component 102 comprises one or more portals 114 configured to connect a peripheral portion, such as a peripheral wall, of the primary space 110 to peripheral space 112. The number and configuration (i.e., size and shape) of the portals 114 in an optical device such as finished lens 100 (FIG. 1) may be suitable to permit sufficient gas exchange to enable adequate oxygenation of the corneal tissue of an eye to which the finished lens is applied. Expressed differently, the number and configuration of the portals 114 do not restrict the capacity of an optical device blank 200 or a lens made therefrom to provide adequate gas exchange between an anterior peripheral surface of the device or lens and a posterior surface (i.e., the surface adjacent the cornea of an eye in a finished lens applied to an eye).

Referring to multicomponent optical device blank 600 illustrated in FIG. 6, posterior support component 604 may comprise portals 614 that have a configuration and perform a function similar to that described above for portals 114, with portals 614 configured to provide fluid communication between peripheral space 612 and primary space 610. In various embodiments, a first posterior component such as component 602 may also have portals 621 that align with portals 614 and thereby further provide fluid communication between peripheral space 614 and primary space 610. Portals 621 may be drilled or otherwise created in first posterior component 602 using any suitable method following mating or assembly of first posterior component 602 with posterior support component 604. In various embodiments, drilling or creating portals 621 after mating or assembly of the components assures alignment of portals 621 with portals 614 and fluid communication between peripheral space 614 and primary space 610. Possible locations of portals 621 in first posterior component 602 of assembled multicomponent optical device blank 600 are outlined with broken lines in FIGS. 6A and 6B.

In various embodiments, portals 621 may be included in first posterior component 602 prior to mating with another component of a multicomponent optical device. For example, FIG. 7A illustrates a first posterior component 602 including portals 621. In various embodiments, portals 621 that may be included in first posterior component 602 prior to mating or assembly may have configurations comprising elliptical, rectangular, or other cross-sectional profiles that may aid in alignment of portals 621 with portals 614 following mating of first posterior component 602 and posterior support component 604.

In various embodiments, a portal 614 in fluid communication with peripheral space 612 may not be in fluid communication with primary space 610. Instead, a portion of first posterior component 602 such as a ridge or flange may occlude fluid communication between portal 614 and primary space 610; however, gas exchange between the primary space 610 and portals 614 (the portals 614 being in fluid communication with peripheral space 612) can still take place due to the gas-permeable material comprising first posterior component 602.

In general, optical device blank 600 comprises components and features that are similar to those of optical device blank 200, as described herein, with the exceptions that portals 614 can be included in posterior support component 604, as described above, and that the anterior skirt 608 comprises a separate component from first posterior component 602. However, the various other features described herein with respect to optical device blank 200 may generally be found in optical device blank 600, and equivalent features between the two optical devices are referred to in the description and in the figures using equivalent numbering.

Figure 4A:
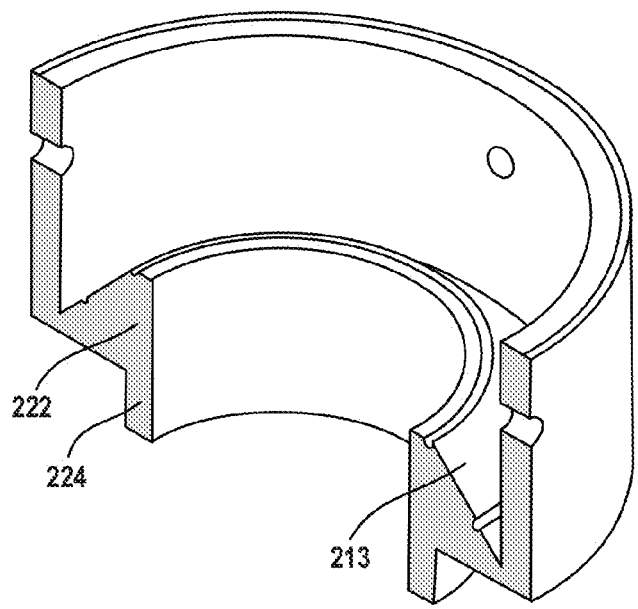
FIGS. 4A and 4B illustrate views of an optical device component in accordance with the present disclosure.
Figure 4B:
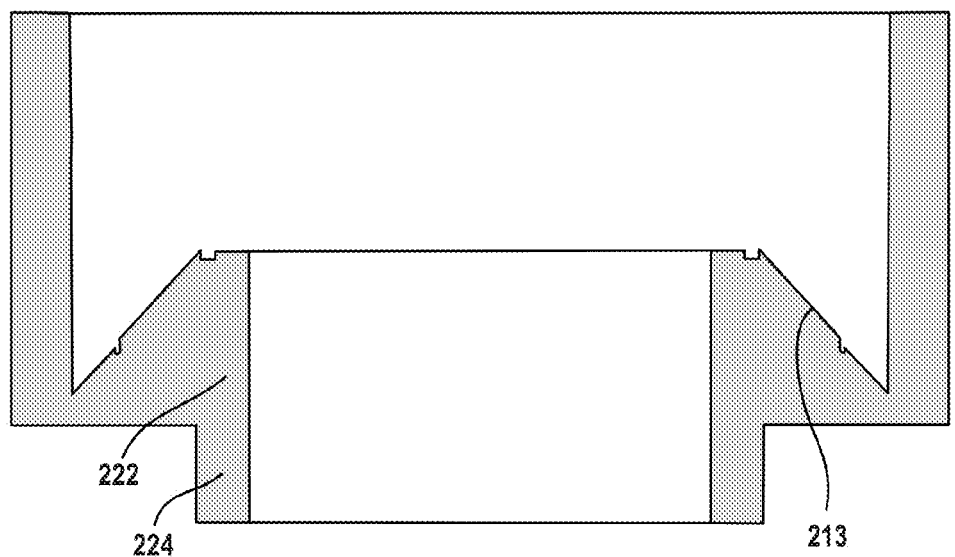

With reference now to FIGS. 4A and 4B, along with continued reference to FIG. 2, an optical device such as blank 200 can also comprise a posterior support component 104. In various embodiments, posterior support component 104 can comprise a rigid optical material that is biocompatible. Posterior support component 104 may or may not comprise a gas permeable material. In accordance with various embodiments, posterior support component 104 comprises a material of suitable hardness and/or rigidity to provide structural support to an optical device such as optical device blank 200 and/or finished lens 100 (FIG. 1). For example, posterior support component 104 may provide structural support for first posterior component 102, anterior skirt 108, and anterior component 106 for at least a portion of a method of manufacturing an optical device and/or a finished lens. The posterior support component 104 may also provide structural support for an optical device comprising a finished lens, for example, a lens such as finished lens 100 (FIG. 1), by providing stabile, flexure-resistant support for a finished multicomponent optical lens with suitable apical clearance as applied to an anterior scleral surface.

In various embodiments, posterior support component 104 can comprise a cylindrical shape with a circumferential wall and an open anterior end defining a cavity within the component. The cavity of a component can generally comprise a receiving portion configured to receive a separate optical device component, such as first posterior component 102, that may be inserted into the cavity or receiving portion. The posterior end can include a bottom wall further comprising a shaft receiving portion 222 with an opening having a diameter that is reduced with respect to the open anterior end of the posterior support component 104. As described above, the opening of the shaft receiving portion 222 and the cavity of posterior support component can be configured to slideably receive first posterior component 102.

Posterior support component 104 can further comprise an axial wall 224 defining a protrusion from a posterior surface of the bottom wall along with the posterior or bottom opening of the shaft receiving portion 222. In various embodiments, the peripheral surface of axial wall 224 and/or the peripheral surface of posterior support component 104 may be suitable for attachment in the collet of a lathe, for example, to facilitate machining of an anterior surface of optical device blank 200.

Posterior support component 104 can also comprise reference features, reference surfaces, and functional surfaces similar and/or complimentary to those previously described with respect to first posterior component 102. For example, posterior support component 104 can comprise a peripheral anterior surface 213, that, together with peripheral posterior surface 211 of first posterior component 102 in assembled optical device blank 200, defines peripheral space 112. Likewise, posterior support component 104 can comprise one or more reference surfaces oriented transversely to the axis of optical device blank 200 that may serve as a positive stop for insertion of first posterior component 102 during a process of assembling optical device blank 200.

Figure 5A:
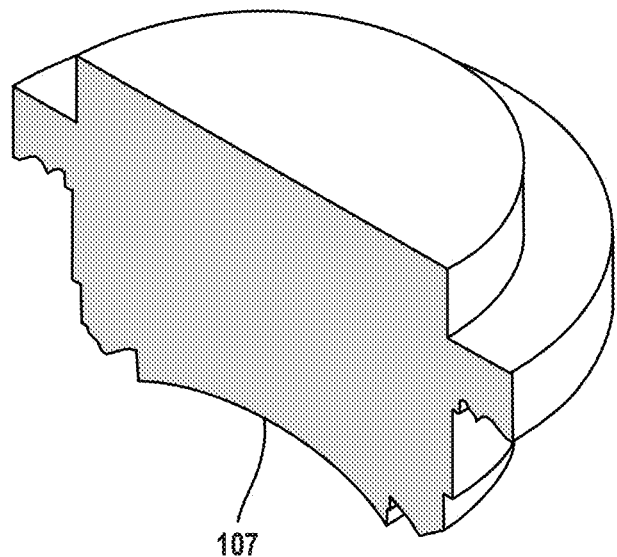
FIGS. 5A and 5B illustrate views of an optical device component in accordance with the present disclosure.
Figure 5B:
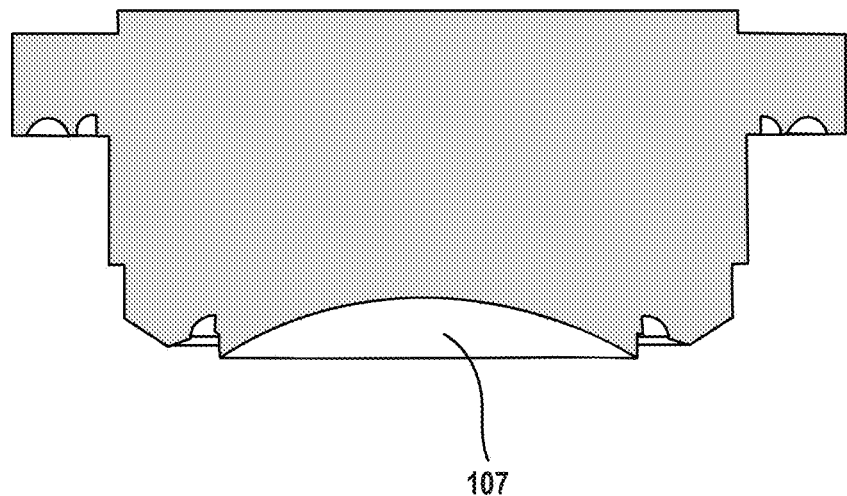

Referring now to FIGS. 5A and 5B, and with continued reference to FIG. 2, an optical device such as blank 200 can also comprise an anterior component 106. In various embodiments, anterior component 106 comprises a cylindrical shape and may have an insertion portion configured for insertion into an anterior component receiving portion of first posterior component 102. Anterior component 106 can also include a peripheral flange comprising a reference surface configured to align with a complimentary reference surface of another optical device component such as first posterior component 102. Likewise, anterior component 106 can further include a reference feature such as those described elsewhere herein.

In accordance with various embodiments, anterior component 106 also comprises posterior surface 207, which can define the anterior boundary of primary space 110. In various embodiments, posterior surface 207 may comprise a concavely curved, optically finished surface, and may further be of a diameter that approximates or is otherwise proportionally related to (i.e., is the same as, is larger than, is 5% smaller than, etc.) a diameter of a cornea or other anatomical feature of an eye.

In accordance with various embodiments, anterior component 106 can comprise any optical device or optical feature, as defined herein. An optical device in accordance with the present disclosure, such as blank 200, or a finished lens made therefrom, such as finished lens 100 (FIG. 1), may provide certain previously unrealized benefits conferred by the structure of the device as described herein that afford substantial latitude in the configuration of anterior component 106 (e.g., thickness) as well as the materials and/or optical features (e.g., gas impermeable materials and/or features that might impede gas exchange of an optical material) used in anterior optical component 106.

In accordance with various embodiments and as mentioned above, a multicomponent optical device can comprise a primary space 110 configured to provide gas exchange for the corneal tissue of an eye. In various embodiments, the primary space has a diameter sufficient to provide gas exchange from the primary space through the posterior wall (i.e., a portion of gas permeable posterior component 102) of the space to the corneal tissue that would underlie an eye to which the optical device was applied. Likewise, a primary space can have a height (i.e., a distance between the anterior wall and the posterior wall of the space) that is sufficient to permit molecular diffusion of a gas such as oxygen and/or bulk flow of air (or any other fluid) from a peripheral portion of the primary space 110 to a remote portion of the primary space, such as the central portion that is most distant from the periphery of the primary space. Expressed differently, the configuration of the primary space, including, for example, the distance and uniformity of the dimension between the anterior and the posterior walls; the diameter of the primary space; the three-dimensional shape of the primary space; the configuration of a peripheral space and the number, size, and configuration of portals communicating between the peripheral space and the primary space; the requirement for structural support such as support rings within the primary space; the overall configuration of the lens including the size and shape of the lens; the composition of the oxygen permeable materials used in the gas exchange zones; and the thickness and surface area of the device in the gas exchange zones; may influence, and can be designed or engineered to accomplish, the optical performance objectives of the multicomponent optical device while providing for sufficient gas exchange of the corneal tissue to ensure corneal tissue health during wear.

In various embodiments, a primary space 110 can also comprise a peripheral channel 230 located at the perimeter or peripheral circumference of the primary space. A peripheral channel 230 can be defined by an anterior component such as anterior component 106 and a first posterior component such as first posterior component 102 and can be continuous with primary space 110. The peripheral channel 230 can be formed or defined by a feature such as a jog or other change in the profile of the anterior component 106, the first posterior component 102, or both. In various embodiments, the peripheral channel of primary space 110 can have a height that is greater than the height of the primary space. The peripheral channel portion of primary space 110 may serve as the portion of the primary space to which portals 114 connect (i.e., portals 114 open in or on the peripheral channel of primary space 110).

Primary space 110 can be filled with any medium, or number of mediums, of matter, for example a gas (e.g., air or oxygen), a liquid (e.g., water or saline), and a solid (e.g., a gel or a rigid solid).

Figure 8:
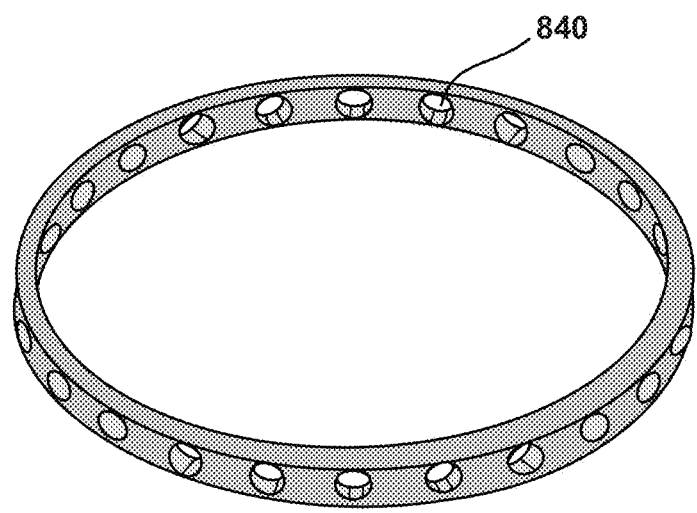
FIG. 8 illustrates a view of a porous spacer ring in accordance with the present disclosure.

In accordance with various embodiments, the configuration of the primary space of an optical device is not deformable, such as to provide adaptability of the optical device to external pressure changes. In various embodiments, a supplementary support component may be included in the primary space of an optical device. For example and with reference to FIG. 2 and FIG. 8, an optical device may include a porous spacer ring 216 in primary space 110. Porous spacer ring 216 may comprise a ring having a height corresponding to the distance between anterior surface 203 and posterior surface 207 defining primary space 110, as well as a diameter smaller than the diameter of primary space 110. In various embodiments, a porous spacer ring 216 can be an independent component, as illustrated in FIG. 8, or a porous spacer ring can comprise or be integral to another component of a device such as anterior component 106 or first posterior component 102. Porous spacer ring 216 can comprise any suitable material, such as an optical material or other structural material. Porous spacer ring 216 can be configured be configured to fit within a primary space 110 and to have a diameter and/or thickness suitable to minimize interference with the optical performance of the device or appearance as a visible artifact to a wearer. Porous spacer ring 216 may also comprise portals or holes 840 in the walls of the ring that enable substantially unobstructed gas exchange within the primary space but do not compromise the ability of the ring to provide supplemental structural support for a uniform height of primary space 110 in an optical device.

In accordance with various embodiments and with reference to FIG. 2, a multicomponent optical device, such as optical device blank 200, can be prepared by a process comprising mating separate device components and bonding the mated components to form a multicomponent optical device. For example, a multicomponent optical device can be prepared by a process comprising mating a gas-permeable first device component, such as first posterior component 102, to a second device component, such as posterior support component 104. In various embodiments, mating can comprise inserting a preformed device component into a receiving portion of a second device component. In other embodiments, mating can comprise injection molding, casting, or otherwise forming or depositing material of one device component into another device component.

A multicomponent optical device can further be prepared by bonding the first device component to the second device component. In accordance with various embodiments, bonding can comprise an interference fit between one or more surfaces and/or surface features of each component. Bonding can also comprise applying an adhesive, welding, or otherwise joining the first device component to the second device component. In various embodiments comprising mating by processes such as molding or casting, mating and bonding may not comprise distinguishable process steps. For example, mating and bonding may essentially occur together upon curing of the molded material. Likewise, where bonding comprises an interference fit, bonding may occur contemporaneously with mating or insertion of one device component into the second device component.

In various embodiments, a multicomponent optical device can be prepared by a process further comprising mating a third device component, such as anterior component 106, to the first device component. In accordance with various embodiments, following mating of the third device component to the first device component, a space such as primary space 110 remains between an anterior surface of the first device component and a posterior surface of the third device component, as described in detail elsewhere herein. In various embodiments, a multicomponent optical device may be prepared by placing a porous spacer ring, such as porous spacer ring 216, between the anterior surface of the first device component and the posterior surface of the third device component. A device can be prepared by further bonding the third device component to the first device component. Mating and bonding of the first and third device components can be performed as described above with respect to the first and second device components.

In various embodiments, a multicomponent optical device can be prepared by a process further comprising forming a peripheral space, such as peripheral space 112, between the second device component and an anterior skirt portion of the first device component. In various embodiments, forming a peripheral space may occur as a result of the completion of a mating and/or bonding step, for example, by aligning reference surfaces and/or functional surfaces of two or more separate components.

In accordance with various embodiments and with reference to FIG. 6, a multicomponent optical device such as optical device blank 600 can be prepared by a process such as that described above with respect to blank 200, the process further comprising mating a gas-permeable anterior skirt component to at least one of the second device component and the third device component, wherein the anterior skirt component is mated separately from the first device component. In such embodiments, the anterior skirt component may comprise a separate component from the first device component. For example, first device component, second device component, third device component, and anterior skirt component may correspond to first posterior component 602, posterior support component 604, anterior component 606, and anterior skirt 608. The anterior skirt component may be bonded to at least one of the second device component and the third device component, and a peripheral space may be formed between the anterior skirt component and the second device component.

In accordance with various embodiments, the components of an optical device, such as blanks 200 and 600, can be mated in any logical order. For example, and with reference to FIG. 6, first posterior component 602 may be mated to the other components in the last mating step, or first posterior component 602 may be mated to posterior support component 604 and anterior component 606 can be mated to anterior skirt 608, followed by mating of the two sets of components.

In accordance with various embodiments, a multicomponent optical device can be prepared by a process further comprising machining a finished lens from a multicomponent optical device blank such as multicomponent optical device blanks 100 and 600. In various embodiments, machining can comprise a process such as milling, lathing, or the like, to produce a finished lens such as a scleral lens that may be applied to an eye.

In accordance with various embodiments, a method of manufacturing a multicomponent optical device is provided. A method can comprise inserting an anterior component comprising an insertion portion having a posterior surface into in a support structure comprising a receiving portion. A method can further comprise aligning a reference surface of the anterior component with a reference surface of the support structure, joining the anterior component to the support structure, and forming a primary space between an anterior surface of the support structure and the posterior surface of the anterior component insertion portion. In accordance with various embodiments, the anterior surface of the optical device support component comprises a gas permeable material, and the primary space formed during the method is configured to permit communication of a gas with at least a portion of the anterior surface of the support structure.

In accordance with various embodiments of a method as disclosed herein and with reference to FIG. 2, an anterior component can comprise a component such as anterior component 106 having the various features previously described with reference thereto. Likewise, a support structure can comprise one or more components, such as first posterior component 102 as a first support structure component and posterior support component 104 as a second support structure component. A third support structure of a method in accordance with various embodiments can comprise a component such as first posterior component 602 (FIG. 6).

In various embodiments, inserting an anterior component can comprise aligning an insertion portion of the anterior component with the receiving portion of the support structure and pressing the anterior component into the support structure. A method can further comprise aligning a reference surface of the anterior component with a corresponding and/or complementary reference surface of the support structure. Aligning a reference surface can comprise aligning one or more sets of reference surfaces, and can further comprise aligning one or more sets of reference features that may or may not be disposed on or in a reference surface. In various embodiments, the inserting step can proceed until one or more sets of complementary reference surfaces come into contact with one another and provide a positive stop (i.e., provide physical interference) to the progress of the inserting step.

A method in accordance with various embodiments can further comprise joining two components, such as joining the anterior component to the support structure. Joining can comprise any type of association between the anterior component and the support structure, such as an interference fit, adhesive bonding, welding, or the like.

In various embodiments, a method can further comprise forming a primary space, such as primary space 110 (FIG. 2) or 610 (FIG. 6), having the features of a primary space previously described herein. The primary space can be formed by inserting and aligning the anterior component with the support structure, as described above, or the primary space can be formed by inserting and aligning a third support structure component, such as first posterior component 602 (FIG. 6).

In various embodiments, mating the oxygen permeable first support structure component to the non-permeable second support structure component can create a peripheral space between the components. Furthermore, the oxygen permeable first support structure component can be configured with portals to permit communication of a gas between the peripheral space and the primary space, as described previously with respect to optical device blanks 200 and 600.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

I claim:

1. An optical device comprising:
   a first posterior component comprising a gas-permeable optical material and an anterior surface;
   a posterior support component, wherein the posterior support component provides structural support for the optical device, and wherein the posterior support component is a gas impermeable optical material;
   an anterior component comprising a posterior surface;
   an anterior skirt comprising a gas-permeable optical material; and
   a primary space between the posterior surface of the anterior component and the anterior surface of the first posterior component, wherein the primary space is configured to permit diffusion of a gas from a perimeter of the primary space through the primary space and across the anterior surface of the first posterior component.

2. The optical device of claim 1, wherein the anterior skirt is configured to permit diffusion of a gas between an optical device anterior peripheral surface and the perimeter of the primary space through the gas-permeable optical material.

3. The optical device of claim 2, wherein the anterior skirt further comprises a peripheral posterior surface, wherein the first posterior component further comprises a peripheral anterior surface, and wherein a peripheral space is defined between the peripheral posterior surface and the peripheral anterior surface.

4. The optical device of claim 3, wherein the peripheral space is in fluid communication with the primary space.

5. The optical device of claim 4, further comprising a plurality of portals configured to provide fluid communication between the peripheral space and the primary space.

6. The optical device of claim 1, wherein the first posterior component and the anterior skirt have a unitary construction.

7. The optical device of claim 1, further comprising a porous spacer ring in the primary space.

8. The optical device of claim 1, wherein the anterior component is a gas impermeable optical material.

9. The optical device of claim 1, wherein the anterior component further comprises an optical feature.

10. An optical device comprising:
a first posterior component comprising a gas-permeable optical material and an anterior surface;
a posterior support component;
an anterior component comprising a posterior surface;
an anterior skirt comprising a gas-permeable optical material and wherein the anterior skirt comprises a portion of the first posterior component; and
a primary space between the posterior surface of the anterior component and the anterior surface of the first posterior component, wherein the anterior skirt further comprises a peripheral posterior surface, wherein the posterior support component further comprises a peripheral anterior surface, and wherein a peripheral space is defined between the peripheral posterior surface and the peripheral anterior surface.

11. The optical device of claim 10, wherein the primary space is configured to permit diffusion of a gas from a perimeter of the primary space through the primary space and across the anterior surface of the first posterior component.

12. The optical device of claim 10, further comprising a porous spacer ring in the primary space.

13. An optical device comprising:
a first posterior component comprising a gas-permeable optical material and an anterior surface;
a posterior support component;
an anterior component comprising a posterior surface;
an anterior skirt comprising a gas-permeable optical material and wherein the anterior skirt comprises a portion of the first posterior component; and
a primary space between the posterior surface of the anterior component and the anterior surface of the first posterior component, wherein the first posterior component is inserted into a receiving portion of the posterior support component.

14. The optical device of claim 13, wherein the primary space is configured to permit diffusion of a gas from a perimeter of the primary space through the primary space and across the anterior surface of the first posterior component.

15. The optical device of claim 13, further comprising a porous spacer ring in the primary space.

16. An optical device comprising:
a first posterior component comprising a gas-permeable optical material and an anterior surface;
a posterior support component;
an anterior component comprising a posterior surface;
an anterior skirt comprising a gas-permeable optical material and wherein the anterior skirt does not comprise a portion of the first posterior component; and
a primary space between the posterior surface of the anterior component and the anterior surface of the first posterior component, wherein the anterior skirt further comprises a peripheral posterior surface, wherein the posterior support component further comprises a peripheral anterior surface, and wherein a peripheral space is defined between the peripheral posterior surface and the peripheral anterior surface.

17. The optical device of claim 16, wherein the primary space is configured to permit diffusion of a gas from a perimeter of the primary space through the primary space and across the anterior surface of the first posterior component.

18. The optical device of claim 16, further comprising a porous spacer ring in the primary space.

19. An optical device comprising:
a first posterior component comprising a gas-permeable optical material and an anterior surface;
a posterior support component;
an anterior component comprising a posterior surface;
an anterior skirt comprising a gas-permeable optical material and wherein the anterior skirt does not comprise a portion of the first posterior component; and
a primary space between the posterior surface of the anterior component and the anterior surface of the first posterior component, wherein the first posterior component is inserted into a receiving portion of the posterior support component.

20. The optical device of claim 19, wherein the primary space is configured to permit diffusion of a gas from a perimeter of the primary space through the primary space and across the anterior surface of the first posterior component.

21. The optical device of claim 19, further comprising a porous spacer ring in the primary space.

* * * * *